United States Patent
Belotserkovsky et al.

(10) Patent No.: US 6,650,617 B1
(45) Date of Patent: Nov. 18, 2003

(54) REDUCED COMPLEXITY FFT WINDOW SYNCHRONIZATION FOR AN ORTHOGONAL FREQUENCY DIVISION MULTIPLEXING SYSTEM

(75) Inventors: Maxim B. Belotserkovsky, Indianapolis, IN (US); Louis Robert Litwin, Jr., Carmel, IN (US)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 09/511,185

(22) Filed: Feb. 22, 2000

(51) Int. Cl.$^7$ ................................................. H04J 11/00
(52) U.S. Cl. ..................... 370/210; 370/208; 370/281; 370/290; 370/292; 370/295; 370/310; 375/232; 375/260; 375/350; 375/355; 375/362
(58) Field of Search ................................. 370/202, 203, 370/206, 207, 208, 252, 277, 278, 281, 290, 210, 292, 295, 310; 375/229, 230, 231, 232, 233, 234, 235, 316, 354, 355, 362, 260, 350

(56) References Cited

U.S. PATENT DOCUMENTS

| | | | |
|---|---|---|---|
| 5,282,222 A | | 1/1994 | Fattouche et al. .............. 375/1 |
| 5,550,812 A | * | 8/1996 | Philips ........................ 370/19 |
| 5,848,107 A | | 12/1998 | Philips ....................... 345/342 |
| 5,920,598 A | | 7/1999 | Hyakudai et al. ........... 375/316 |
| 5,953,311 A | | 9/1999 | Davies et al. ............... 370/210 |
| 5,963,592 A | * | 10/1999 | Kim ............................ 375/232 |
| 5,995,568 A | * | 11/1999 | Molnar et al. ............... 375/354 |
| 6,359,938 B1 | * | 3/2002 | Keevill et al. .............. 375/316 |
| 6,421,401 B1 | * | 7/2002 | Palin .......................... 375/343 |
| 6,483,553 B1 | * | 11/2002 | Jung .......................... 348/731 |

FOREIGN PATENT DOCUMENTS

| | | | |
|---|---|---|---|
| EP | 0898381 | 2/1999 | ........... H04B/7/005 |
| EP | 0903898 | 3/1999 | ........... H04L/27/26 |
| EP | 1 063 824 A2 | 12/2000 | ........... H04L/27/26 |
| FR | 2 743 967 A1 | 7/1997 | ............. H04L/5/26 |
| WO | WO98/39872 | 9/1998 | ............. H04L/5/06 |
| WO | WO98/39886 | 9/1998 | ........... H04L/27/26 |
| WO | WO99/17492 | 4/1999 | ............. H04L/5/06 |
| WO | WO99/17493 | 4/1999 | ............. H04L/5/06 |
| WO | WO99/27671 | 6/1999 | ............ H04J/11/00 |

OTHER PUBLICATIONS

J. A. C. Bingham, "Multicarrier Modulation For Data Transmission: An Idea Whose Time Has Come", May 1990—IEEE Communications Magazine.

Andréas Czylwik, *Degradation of Multicarrier and Single Carrier Transmission with Frequency Domain Equalization due to Pilot–Aided Channel Estimation and Frequency Synchronization*, IEEE Telecommunications Conference, vol. 1, No. 3, Nov. 1997, pp. 27–31.

* cited by examiner

*Primary Examiner*—Dang Ton
*Assistant Examiner*—Shick Hom
(74) *Attorney, Agent, or Firm*—Joseph S Tripoli; Ronald H Kurdyla; Vincent E Duffy

(57) ABSTRACT

An Orthogonal Frequency Division Multiplexing (OFDM) receiver that compensates for FFT window drift by extracting pilots from a fast Fourier transformed and equalized OFDM signal, and processing the extracted pilots to derive an FFT window adjustment factor and an associated equalizer tap adjustment value. The OFDM receiver simultaneously controls the position of an FFT window and the phase of equalizer taps using the derived FFT adjustment factor and equalizer tap adjustment value.

22 Claims, 4 Drawing Sheets

REDUCED COMPLEXITY FFT WINDOW SYNCHRONIZATION FOR AN ORTHOGONAL FREQUENCY DIVISION MULTIPLEXING SYSTEM

FIELD OF THE INVENTION

The present invention relates to processing orthogonal frequency division multiplexed (OFDM) signals.

BACKGROUND OF THE INVENTION

A wireless LAN (WLAN) is a flexible data communications system implemented as an extension to, or as an alternative for, a wired LAN within a building or campus. Using electromagnetic waves, WLANs transmit and receive data over the air, minimizing the need for wired connections. Thus, WLANs combine data connectivity with user mobility, and, through simplified configuration, enable movable LANs. Some industries that have benefited from the productivity gains of using portable terminals (e.g., notebook computers) to transmit and receive real-time information are the digital home networking, health-care, retail, manufacturing, and warehousing industries.

Manufacturers of WLANs have a range of transmission technologies to choose from when designing a WLAN. Some exemplary technologies are multicarrier systems, spread spectrum systems, narrowband systems, and infrared systems. Although each system has its own benefits and detriments, one particular type of multicarrier transmission system, orthogonal frequency division multiplexing (OFDM), has proven to be exceptionally useful for WLAN communications.

OFDM is a robust technique for efficiently transmitting data over a channel. The technique uses a plurality of sub-carrier frequencies (sub-carriers) within a channel bandwidth to transmit data. These sub-carriers are arranged for optimal bandwidth efficiency compared to conventional frequency division multiplexing (FDM) which can waste portions of the channel bandwidth in order to separate and isolate the sub-carrier frequency spectra and thereby avoid inter-carrier interference (ICI). By contrast, although the frequency spectra of OFDM sub-carriers overlap significantly within the OFDM channel bandwidth, OFDM nonetheless allows resolution and recovery of the information that has been modulated onto each sub-carrier.

The transmission of data through a channel via OFDM signals also provides several other advantages over more conventional transmission techniques. Some of these advantages are a tolerance to multipath delay spread and frequency selective fading, efficient spectrum usage simplified sub-channel equalization, and good interference properties.

Referring now to FIG. 1, an OFDM signal 10 is transmitted as blocks of user data 12 separated by guard intervals known as cyclic prefixes 14. A cyclic prefix 14 is a copy of a portion of an adjacent block of user data 12 and is used to reduce Inter-Symbol Interference (ISI) caused by multipath fading. More particularly, only cyclic prefixes 14, as opposed to user data 12, are effected by ISI, as is known by those skilled in the art. Thus the removal of cyclic prefixes 14 by an OFDM receiver removes the effects of ISI from the received OFDM signal.

At the OFDM receiver a received OFDM signal 10 is digitized or sampled to convert the OFDM signal from an analog to a digital signal. Afterwards, the OFDM receiver applies Fast Fourier Transform (FFT) windows to the OFDM signal to remove the cyclic prefixes from a received OFDM signal. Ideally, an OFDM window 16 only passes user data 12 to an FFT unit 18 and discards cyclic prefixes 14. However, if there is a sampling frequency offset between the OFDM transmitter and the OFDM receiver, FFT window 16 may drift beyond the boundaries of user data 12. If this drift occurs, as shown in FIG. 2, a portion or sample 20 of cyclic prefix 14 may be passed to FFT unit 18 and a portion or sample 22 of user data 12 may be lost. As a result, the window drifting effect may result in the presence of ISI in a received OFDM signal. Furthermore, an offset of FFT window 16 will result in a phase rotation in the output of FFT unit 18. The rotation occurs because a time shift in the time domain results in a phase rotation in the frequency domain. The phase rotation may generate errors in the user data recovered by the OFDM receiver.

One way to correct for the drifting effect is to lock the frequency of the receiver's sampler or ADC to the transmitter sampling frequency using a phase-locked loop. Turning to FIG. 3, an exemplary phase-locked loop configuration 24 includes an ADC 26 that samples a received OFDM signal. An FFT window unit 28 receives the OFDM samples, removes cyclic prefixes, and passes user data to a FFT unit 30, as discussed above. A pilot extractor 32 extracts pilots imbedded in the user data and passes the pilots to a phase difference calculator 32. A pilot is a reference signal (having a known phase) that is embedded in an OFDM symbol on a predetermined subcarrier. Phase difference calculator 32 calculates the phase difference between the pilots within the OFDM symbols and passes the calculated difference to a sampling offset detector 36. Sampling offset detector 36 detects a sampling offset between the transmitter and receiver using the calculated difference and outputs the sampling offset to a digital phase-locked loop 38. Digital phase-locked loop 38 controls the sampling clocks of ADC 26 and ensures consistent FFT window positioning throughout the reception of the transmission once digital phase-locked loop 38 has locked.

Although PLL configuration 24 ensures consistent FFT window positioning once digital phase-locked loop 38 has locked, PLL configuration 24 has several drawbacks. One drawback is that PLL configuration 24 may not correctly position the FFT window due to noise and channel effects. The incorrect positioning (i.e., window offset) may cause a phase rotation in the output of FFT unit 30 that, in turn, may cause errors in the user data recovered by the OFDM receiver. Another drawback is that digital phase-locked loop 38 of PLL configuration 24 is costly to implement.

If the local sampling clock of the OFDM receiver has a small offset with respect to the transmitter sampling frequency it may be advantageous (e.g., to reduce costs) to remove the digital phase-locked loop and utilize a free-running local clock. However, by utilizing a free-running clock without a phase-locked loop, a small sampling offset, over time, can accumulate and shift the FFT window beyond the user data boundaries. As noted above, the FFT window shift may introduce errors, such as ISI, into the user data portion of a received OFDM symbol. The present invention is directed to the correction of this problem.

SUMMARY OF THE INVENTION

An Orthogonal Frequency Division Multiplexing (OFDM) receiver that extracts pilots from a fast Fourier transformed and equalized OFDM signal, and processes the extracted pilots to derive an FFT window adjustment factor and an associated equalizer tap adjustment value. The OFDM receiver simultaneously controls the position of an FFT window and the phase of equalizer taps using the FFT adjustment factor and equalizer tap adjustment value.

BRIEF DESCRIPTION OF THE DRAWINGS

The aforementioned advantages of the invention, as well as additional advantages thereof, will be more fully understood as a result of a detailed description of the preferred embodiment when taken in conjunction with the accompanying drawings in which.

DETAILED DESCRIPTION OF THE PREFERRED EMBODIMENT

The characteristics and advantages of the present invention will become more apparent from the following description, given by way of example.

Figure 1:
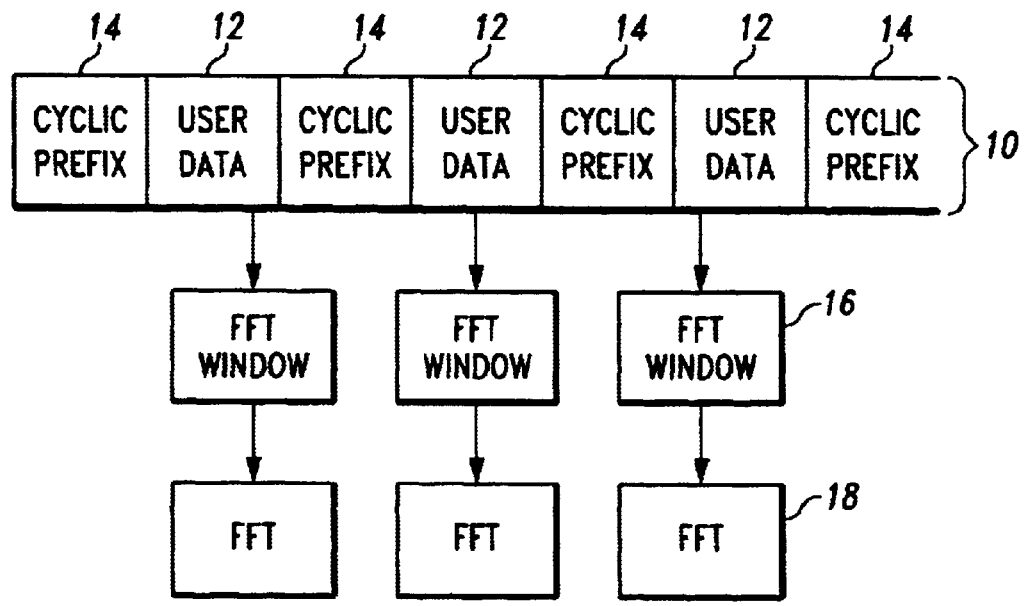
FIG. 1 is a diagram of an OFDM signal having user data and cyclic prefix portions, and associated processors.
Figure 2:
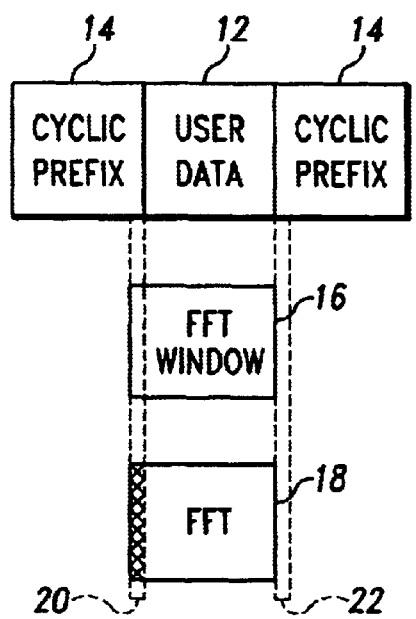
FIG. 2 is diagram illustrating the presence of FFT window drift.
Figure 3:
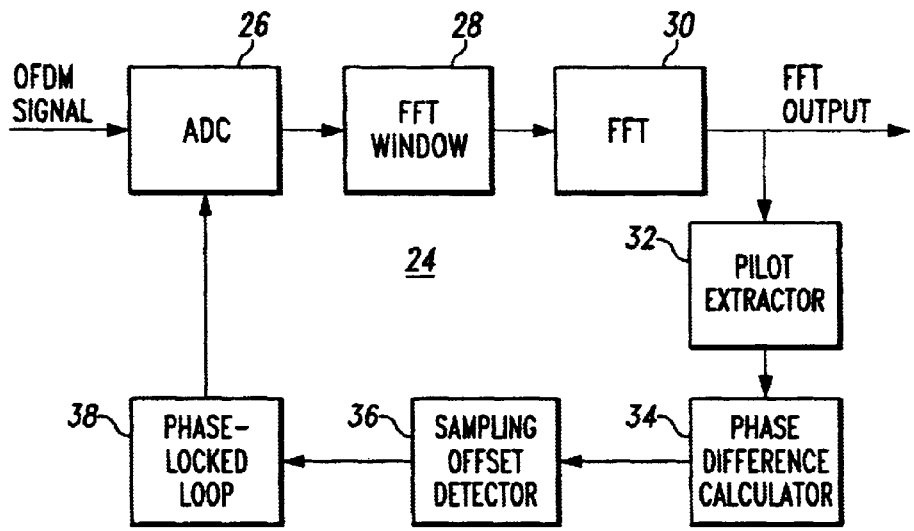
FIG. 3 is a block diagram of a phase lock loop configuration for a conventional OFDM receiver.
Figure 4:
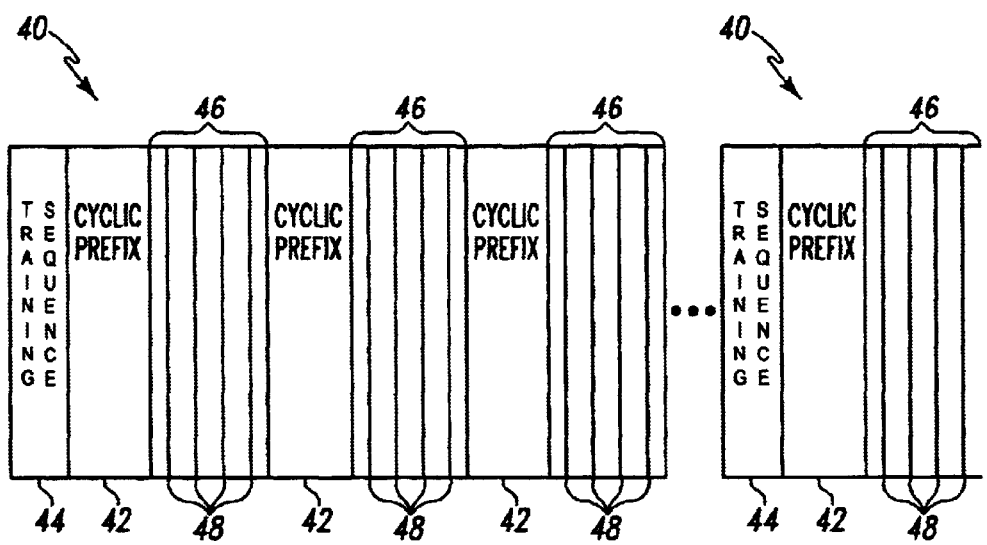
FIG. 4 is a diagram illustrating the placement of a training sequence, user data, and pilot signals within an OFDM symbol frame according to the present invention.

Turning to FIG. 4, an exemplary OFDM symbol frame 40 of the present invention is shown. Symbol frame 40 includes a training sequence 44 containing known transmission values for each subcarrier in the OFDM carrier, and a predetermined number of cyclic prefix 42 and user data 46 pairs. User data 46 has a predetermined number of pilots 48, also containing known transmission values, embedded on predetermined subcarriers. For example, the proposed ETSI-BRAN HIPERLAN/2 (Europe) and IEEE 802.11a (USA) wireless LAN standards, herein incorporated by reference, have four pilots located at bins or subcarriers ±7 and ±21.

Figure 5:
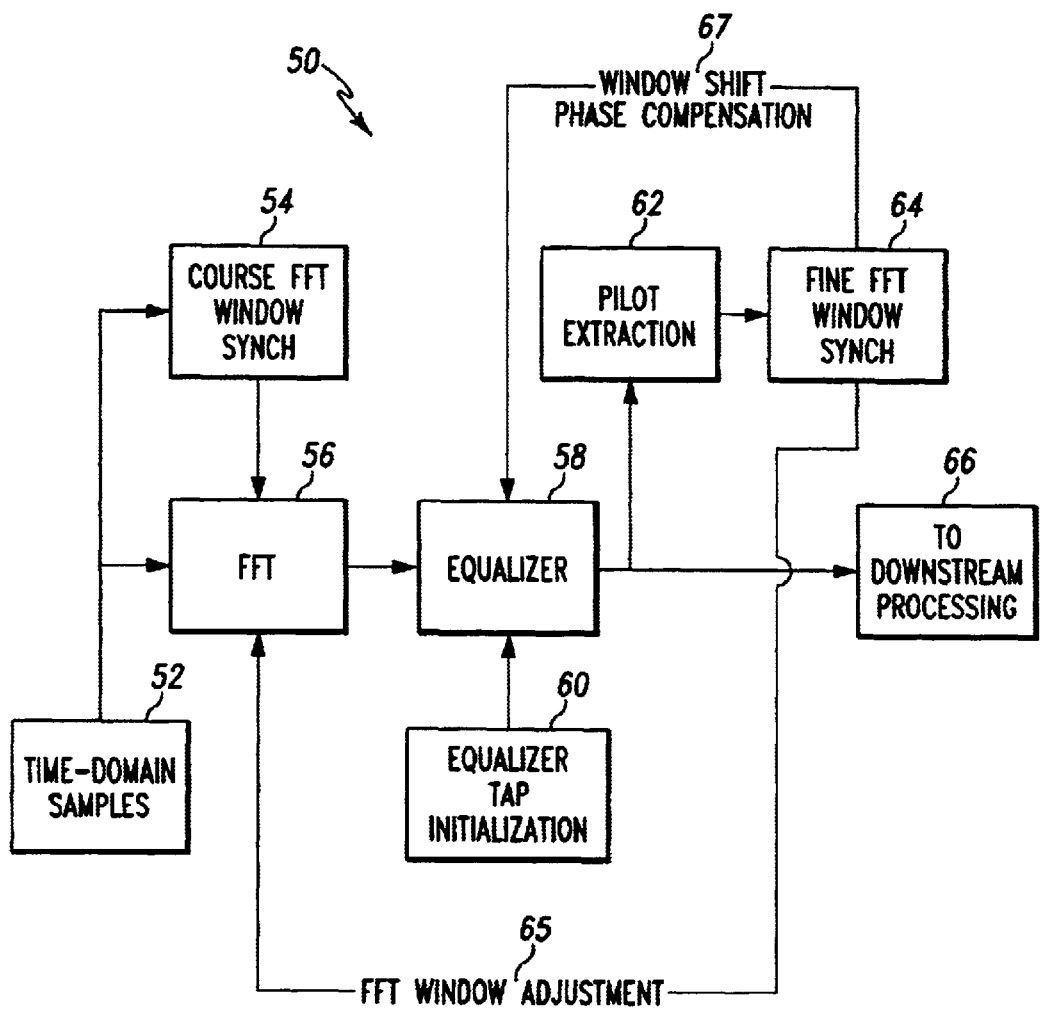
FIG. 5 is a block diagram illustrating a window shift correction arrangement for an OFDM receiver according to the present invention.

Referring now to FIG. 5, an FFT window synchronization network or system 50 of the present invention is shown. It should be noted that system 50 may be embodied in software, hardware, or some combination thereof. For example, system 50 may be part of an WLAN adapter that is implemented as a PC card for a notebook or palmtop computer, as a card in a desktop computer, or integrated within a hand-held computer. System 50 is coupled to a source 52 of OFDM time-domain samples (e.g., the output of an ADC driven by a free running clock that is not controlled by a PLL) that has a small sampling frequency offset with respect to the sampling frequency of an OFDM transmitter. As noted above, such an offset could cause an FFT window drift which, in turn, may result in a phase rotation in the output of an FFT unit and ISI. System 50 includes a coarse FFT window synch unit 54 coupled to source 52 and an FFT unit 56. Coarse FFT window synch unit 54 obtains an initial estimate of the FFT window position and triggers FFT unit 56 when the samples from source 52 fall within the estimated window position. Coarse window synch unit 54 may use known window synch techniques such as detection of cross-correlation peaks or autocorrelation peaks of a known training sequence (e.g., training sequence 44 of FIG. 4). Coarse window synch unit 54 obtains an approximate (within several samples of the correct window position) initial estimate of the window position. Afterwards, the window position is finely adjusted, as described in further detail below.

An equalizer 58 is coupled to the output of FFT unit 56. Equalizer 58 reduces the multi-path distortion effects of the channel that the OFDM signal is transmitted through. Equalizer 58 is initialized using a training sequence (e.g., training sequence 44 of FIG. 4) stored in a memory 60 to set the equalizer tap settings. As discussed above, the training sequence contains known transmission values on all of the subcarriers of the OFDM carrier. A conventional technique for computing an initial tap value for each subcarrier is to set the tap for the subcarrier equal to the known transmission value of the subcarrier (as stored in memory 60) divided by the output on the subcarrier received from FFT unit 56. The initialization of equalizer 58 not only reduces the effect of the channel but also cancels out a phase rotation generated by an incorrect FFT window position. However, according to a feature of the present invention, the initialization only cancels out the phase rotation of the pilot subcarriers at the time of initialization, and equalizer 58 does not track the continuous phase rotations of the pilot subcarriers caused by a drifting window position.

After the taps of equalizer 58 are initially set, equalizer 58 adapts the equalizer taps for the data subcarriers but does not adapt the taps for the pilot subcarriers (e.g., pilots 48 of FIG. 4). Equalizer 58 does not adapt the pilot taps so the phase rotation generated by incorrect FFT window position is passed on the pilot subcarriers to a pilot extraction unit 62 and a fine FFT window synch unit 64, as discussed in further detail below.

Pilot extraction unit 62 is coupled to an output of equalizer 58 and an input of fine FFT window synch unit 64. Pilot extraction unit 62 extracts pilots (e.g., pilots 48 of FIG. 4) embedded in the user data (e.g., user data 46 of FIG. 4) sent to downstream processing 66 (e.g., demodulation, decoding, and the like) and passes the pilots to a fine FFT window synch unit 64. Fine FFT window synch unit 64 is coupled to an input of FFT unit 56 to finely adjust FFT window position. Fine FFT window synch unit 64 is also coupled to an input of equalizer 58 to adjust the phase rotation of the equalizer taps. More specifically, fine FFT window synch unit 64 executes an algorithm that provides two outputs. The first output is a fine window adjustment factor 65 that is passed to FFT unit 56 to shift an FFT window in one sample increments. The second output is a phase compensation value 67 that is passed to equalizer 58 in order to rotate the equalizer taps in an equal but opposite direction from the phase rotation that is induced by the fine adjustment of the FFT window. The rotation of the equalizer taps is necessary to avoid a discrete phase jump that could disturb the tracking ability of equalizer 58.

Figure 6:
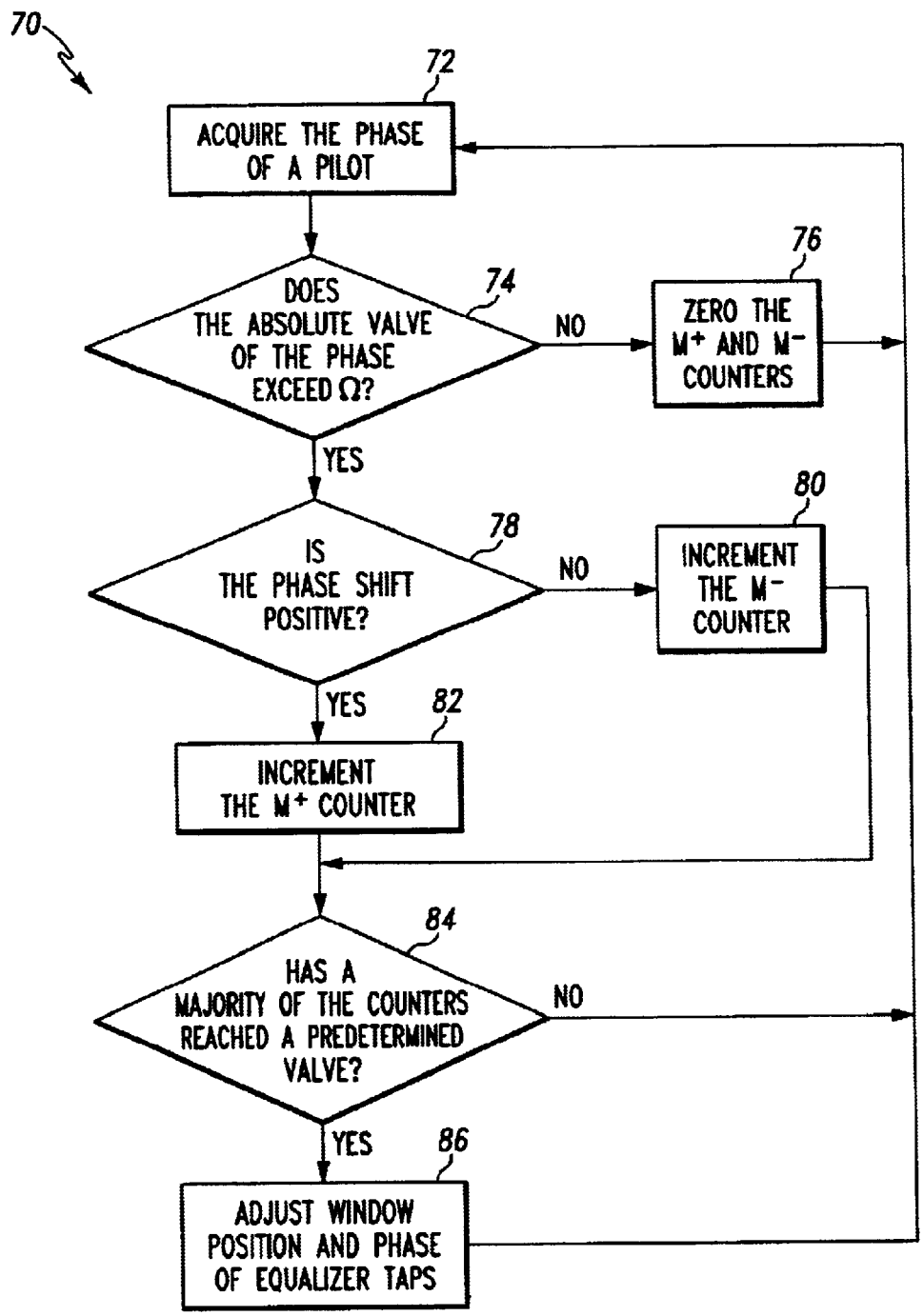
FIG. 6 is a flowchart illustrating an FFT window correction algorithm of the present invention.

Referring now to FIG. 6, a flowchart 70 illustrating the algorithm of the present invention is shown. Initially, at step 72, fine FFT window synch unit 64 acquires the phase of a pilot embedded in the user data. Next, at step 74, fine FFT window synch unit 64 compares the absolute value of the acquired phase to the absolute value of $\Omega$. $\Omega$ is defined as:

$$\Omega = kTs + [sgn(k) * \lambda]$$

Wherein k is the subcarrier or bin location of the pilot (e.g., ±7 or ±21). Ts is the phase shift of the lowest positive frequency subcarrier that results from an FFT window offset of 1 sample (e.g., the phase shift that would occur at subcarrier or bin location +1). Thus, for k-th carrier, the corresponding phase shift is kTs (e.g., at the 7$^{th}$ subcarrier the phase shift is 7Ts). λ is a safety margin or buffer value that is added to kTs in order to prevent a false window adjustment due to noise. The sgn( ) denotes a signum function that generates a +1 or a −1 depending on the sign of the subcarrier location (e.g., at the +7 bin location the sgn( ) function generates a +1 and at the −7 bin location the sgn( ) function generates a −1).

If the absolute value of the phase does not exceed the absolute value of Ω, the fine FFT window synch unit 64 resets or zeroes the positive phase shift (M$^+$) and negative phase shift (M$^-$) counters and, returning to step 72, acquires the phase of the next pilot. It should be noted that there are positive and negative phase shift counters (M$^+$ and M$^-$) for each pilot subcarrier. For example, if pilots are located at the ±7 and ±21 bins, there will be eight counters allocated for tracking positive and negative phase shifts on the ±7 and ±21 bins.

If the absolute value of the phase exceeds the absolute value of Ω, the fine FFT window synch unit 64, at step 78, determines if the phase shift is positive. If the phase shift is positive, the fine FFT window synch unit 64, at step 82, increments the positive phase shift counter (M$^+$) associated with the pilot by 1. If the phase shift is not positive, fine FFT window synch unit 64, at step 80, increments the negative phase shift counter (M$^-$) associated with the pilot by 1.

After incrementing a counter (either M$^+$ or M$^-$) for a given pilot, fine FFT window synch unit 64, at step 84, determines if a majority of the counters (M$^+$ or M$^-$) for all the pilots have reached a threshold or predetermined value. For example, if the pilots are located at ±7 and ±21, fine FFT window synch unit 64 acquires the count of the eight counters (four M$^+$ counters and four M$^-$ counters). Afterwards, fine FFT window synch unit 64 determines if a majority of the M$^+$ or M$^-$ counters have reached a predetermined value (e.g., a value of 5). If the predetermined value has not been reached, the fine FFT window synch unit 64 returns to step 72 and acquires the phase of the next pilot. When the predetermined value is reached the FFT window is adjusted by at least 1 sample. The direction of adjustment is selected based upon which counters (either M$^+$ or M$^-$) have reached the predetermined value. Thus, if the predetermined value has been reached, fine FFT window synch unit 64, at step 86, adjust the window position of FFT. 56 and the phase of the equalizer taps of equalizer 58, as discussed in further detail below. It should be noted that the threshold or predetermined value is used to reduce the effects of noise on the detection of a window offset. For example, an increase in noise may cause the absolute value of a detected pilot phase to exceed Ω once. However, only a phase rotation induced by a window shift would cause multiple successive occurrences of a pilot phase exceeding Ω.

Adjusting the FFT window position by a sample creates a discontinuous jump in phase for the frequency-domain data. To avoid the discontinuous jump in phase, the phase of each equalizer data tap is adjusted by kTs radians where the direction of the rotation adjustment is opposite the direction of the rotation that would have otherwise been induced by the FFT window shift. However, it should be noted that the phases of the equalizer pilot taps are not adjusted so fine FFT window synch unit 64 can track the phase changes of the pilot subcarriers caused by FFT window drift.

Thus according to the principle of the present invention, an OFDM receiver extracts pilots from a Fast Fourier Transformed and equalized OFDM signal, and processes the extracted pilots to derive an FFT window adjustment factor and an associated equalizer tap adjustment value. The OFDM receiver simultaneously controls the position of an FFT window and the phase of equalizer taps using the FFT adjustment factor and equalizer tap adjustment value.

While the present invention has been described with reference to the preferred embodiments, it is apparent that various changes may be made in the embodiments without departing from the spirit and the scope of the invention, as defined by the appended claims.

What is claimed is:

1. A method of Fast Fourier Transform (FFT) window position recovery in an Orthogonal Frequency Division Multiplexing (OFDM) receiver, the method comprising the steps of:
   preprocessing a received OFDM signal to produce a Fast Fourier Transformed and equalized OFDM signal;
   extracting a pilot from the Fast Fourier Transformed and equalized OFDM signal;
   processing the extracted pilot to derive an FFT window adjustment value representing a window drift correction and an associated equalizer tap adjustment value representing a phase correction that negates the effect of the window drift correction on an equalizer tap; and
   utilizing the adjustment values in the preprocessing step.

2. The method of claim 1, wherein the OFDM receiver is implemented in a wireless LAN adapter.

3. The method of claim 1, wherein the OFDM receiver is integrated within one of a portable or desktop computer.

4. The method of claim 1, wherein the step of utilizing the adjustment values in the preprocessing step includes simultaneously controlling a position of an FFT window and a phase of an equalizer tap using the FFT window adjustment value and the associated equalizer tap adjustment value.

5. The method of claim 1, wherein the equalizer tap is an equalizer data tap.

6. The method of claim 1, wherein the step of processing includes:
   comparing a phase of the extracted pilot to a predetermined value;
   incrementing a counter if the phase exceeds the predetermined value; and
   generating the FFT window adjustment value and the associated equalizer tap adjustment value if the counter exceeds a threshold value.

7. The method of claim 6, wherein the predetermined value represents a phase rotation due to an FFT window offset.

8. The method of claim 7, wherein the predetermined value also includes a noise buffer value.

9. The method of claim 6, wherein the threshold value is selected to reduce the effects of noise on FFT window position recovery.

10. An apparatus for Fast Fourier Transform (FFT) window position recovery in an Orthogonal Frequency Division Multiplexing (OFDM) receiver, the apparatus comprising:
    an FFT window module for receiving an OFDM signal and removing a cyclic prefix from the OFDM signal;
    an FFT module for Fast Fourier Transforming the windowed OFDM signal;
    an equalizer module for removing a channel distortion from the transformed OFDM signal; and
    a window adjustment module for extracting a pilot from the transformed OFDM signal, comparing the phase of the extracted pilot with a predetermined value, and altering the operation of the FFT window module and the equalizer module if the phase of the extracted pilot exceeds the predetermined value a predetermined number of times.

11. The apparatus of claim 10, wherein the predetermined value represents a phase rotation due to an FFT window offset.

12. The apparatus of claim 11, wherein the predetermined value also includes a noise buffer value.

13. The apparatus of claim 11, wherein the FFT window offset is an offset of one sample.

14. The apparatus of claim 10, wherein the window adjustment module simultaneously controls a window position of the FFT window module and a phase of an equalizer data tap of the equalizer module.

15. The apparatus of claim 14, wherein the phase of the equalizer data tap is adjusted to cancel out a phase rotation induced by a shifting of the window position.

16. The apparatus of claim 10, wherein the OFDM receiver is implemented in a wireless LAN adapter.

17. The apparatus of claim 10, wherein the OFDM receiver is integrated within one of a portable or desktop computer.

18. A method of Fast Fourier Transform (FFT) window position recovery in an Orthogonal Frequency Division Multiplexing (OFDM) receiver, the method comprising the steps of:

preprocessing a received OFDM signal to produce a Fast Fourier Transformed and equalized OFDM signal;

extracting a pilot from the Fast Fourier Transformed and equalized OFDM signal;

comparing a phase of the extracted pilot to a predetermined value;

incrementing a counter if the phase exceeds the predetermined value; and generating an FFT window adjustment value and an associated equalizer tap adjustment value if the counter exceeds a threshold value; and utilizing the adjustment values in the preprocessing step.

19. The method of claim 18, wherein the predetermined value represents a phase rotation due to an FFT window offset.

20. The method of claim 19, wherein the predetermined value also includes a noise buffer value.

21. The method of claim 18, wherein the threshold value is selected to reduce the effects of noise on FFT window position recovery.

22. An apparatus for Fast Fourier Transform (FFT) window position recovery in an Orthogonal Frequency Division Multiplexing (OFDM) receiver, the apparatus comprising:

an FFT window module for receiving an OFDM signal and removing a cyclic prefix from the OFDM signal;

an FFT module for Fast Fourier Transforming the windowed OFDM signal;

an equalizer module for removing a channel distortion from the transformed OFDM signal; and a window adjustment module for extracting a pilot from the transformed OFDM signal and, in response to a phase of the extracted pilot, simultaneously controlling a window position of the FFT window module and a phase of an equalizer data tap of the equalizer module such that the phase of the equalizer data tap is adjusted to cancel out a phase rotation induced by a shifting of the window position.

* * * * *